United States Patent [19]

Sutman

[11] Patent Number: 5,660,683
[45] Date of Patent: Aug. 26, 1997

[54] PROCESS FOR DEINKING WASTE PAPER USING A MIXTURE OF THIOL ETHOXYLATE AND ALCOHOL ALKOXYLATES

[75] Inventor: Frank J. Sutman, Jacksonville, Fla.

[73] Assignee: BetzDearborn Inc., Trevose, Pa.

[21] Appl. No.: 432,738

[22] Filed: May 2, 1995

[51] Int. Cl.⁶ ........................................................ D21C 5/02
[52] U.S. Cl. ........................................................ 162/5; 162/4
[58] Field of Search .................................................. 162/4, 5

[56] References Cited

U.S. PATENT DOCUMENTS

| | | | |
|---|---|---|---|
| 4,618,400 | 10/1986 | Wood et al. | 162/5 |
| 5,024,821 | 6/1991 | Greenshields et al. | 423/23 |
| 5,200,034 | 4/1993 | Richmann et al. | 162/5 |
| 5,248,388 | 9/1993 | Richmann et al. | 162/5 |
| 5,417,807 | 5/1995 | Fossas et al. | 162/5 |
| 5,417,808 | 5/1995 | Okamoto et al. | 162/5 |

FOREIGN PATENT DOCUMENTS 0492507  7/1992  European Pat. Off. .

OTHER PUBLICATIONS

Derwent Publications Ltd., AN 86-260376.

*Primary Examiner*—Donald E. Czaja
*Assistant Examiner*—Dean T. Nguyen
*Attorney, Agent, or Firm*—Alexander D. Ricci; Richard A. Paikoff

[57] ABSTRACT

A process and composition for deinking waste paper is disclosed. The process comprises administering a sufficient amount of a mixture containing (a) an alcohol, randomly alkoxylated with a mixture of alkylene oxides to form a surfactant, (b) a thiol ethoxylate surfactant, and (c) a secondary alcohol alkoxylate, to a sample of waste paper for which treatment is desired. The surfactant enhances the aggregation and densification of electrostatic toner particles, while promoting foaming in the aqueous slurry.

5 Claims, 1 Drawing Sheet

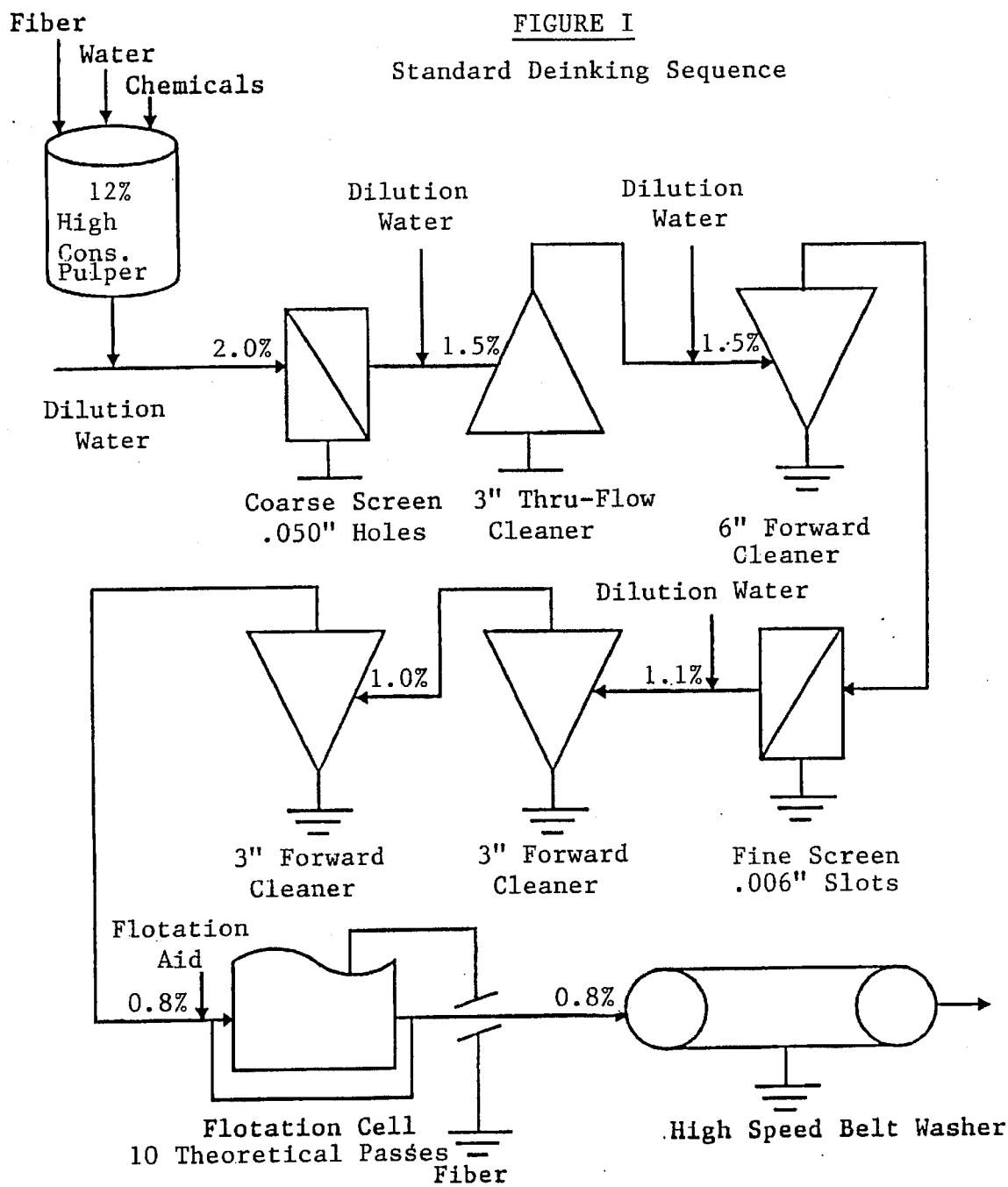

PROCESS FOR DEINKING WASTE PAPER USING A MIXTURE OF THIOL ETHOXYLATE AND ALCOHOL ALKOXYLATES

BACKGROUND OF THE INVENTION

Dry toner electrostatic printing inks, including laser and xerographic inks, are important and growing contaminants in the area of wastepaper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

Some deinking systems employ chemical aggregation/densification followed by forward cleaning to remove non-impact inks, and flotation deinking to remove impact inks (i.e., offset) and other contaminants. The chemical nature of many of these deinking products has caused them to act as defoamers in aqueous papermaking systems. A separate flotation aid is thus often added to the flotation cell in order to overcome the defoaming effect of the earlier chemicals.

Furthermore, many aggregation/densification systems use relatively high application dosages in order to provide effective treatment. Existing office waste deinking technology utilizes product dosages of about 0.60%–0.75% on fiber to aggregate and densify the toner particles.

BRIEF DESCRIPTION OF THE DRAWING

FIG. 1 is a schematic drawing of a standard deinking process.

DETAILED DESCRIPTION OF THE INVENTION

The present invention provides a process for the deinking of waste-paper containing electrostatic printed ink, impact printed ink, or combinations thereof, which comprises adding to an aqueous slurry of the waste-paper a compound which enhances the aggregation and densification of electrostatic toner particles, while promoting foaming in said aqueous slurry. A preferred class of compounds are the random alcohol alkoxylates, with a random linear alcohol alkoxylate surfactant being particularly preferred, although branched forms of these compounds are also anticipated to be effective. This substance has the following structure:

$$CH_3-(CH_2)_x-O-(CH_2CH_2O)_y-(CH_2CH(CH_3)O)_zH$$

$11 \leq x \leq 14$ molecular weight≡800 particularly preferred.

The process of the present invention includes the following steps: wastepaper stocks containing electrostatic printed ink, impact printed ink, or combinations thereof are converted to a pulp. The pulp is then contacted with an aqueous medium containing an amount, effective for the purpose of a treatment comprising a random alcohol alkoxylate surfactant, e.g., with ethylene oxide and propylene oxide groups, and a thiol ethoxylate surfactant, the latter preferably with a degree of ethoxylation of up to about 3 moles of ethylene oxide. The resulting pulp-containing medium is then mechanically processed to remove treated ink therefrom.

The molecular weight range of the random linear alcohol alkoxylate surfactant is preferably from about 600–1000; the temperature of treatment may be from about 130° F.–180° F., with a pH of from about 5.0 to about 12.0 preferred. Furthermore, the random alcohol alkoxylate surfactant possesses an aqueous cloud point of about 15°–25° C.

By random alcohol alkoxylate, it is meant an alcohol randomly alkoxylated with a mixture of alkylene oxides (e.g., ethylene oxide and propylene oxide) as described below.

Conventional blocked alkoxylates have all of theoxyethylene monomers congruent to each other on the chain. All of the oxypropylene monomers follow, forming a cap. Molecules of this type which are effective for office waste deinking are typically water-insoluble, and act as defoamers. Random alkoxylates react ethylene oxide and propylene oxide at the same time with the alcohol hydrophobe. A randomized distribution of the oxyethylene and oxypropylene monomers is therefore obtained. These compounds have been found to be efficient agents to aggregate and densify non-impact inks while remaining water soluble.

An important improvement over previous treatment approaches is the foaming potential of the formulations which allows for the complete elimination of a separate flotation deinking agent. The result is that an effective aggregation/densification agent for electrostatic printing inks may also act as a flotation aid.

In addition, enhanced treatment efficiencies are obtained at lower product dosages as compared to previous treatments. The stock is deinked at a product dosage of about 0.30 weight % on fiber, as compared to about 0.60–0.75% on fiber with previous treatments (weight percent is based on dry fiber in pulper).

EXAMPLES

Example 1

A dose of 0.30% on fiber of a formulation containing a random linear alcohol alkoxylate, a thiol ethoxylate and a secondary alcohol ethoxylate (the latter with an HLB≦10) were added to a pilot-scale hydrapulper containing 200 pounds of sorted office waste and 200 gallons of water, which had been heated to 150° F. and adjusted to a pH of 11 with sodium hydroxide. The mixture was pulped for 45 minutes. After pulping, it was diluted and processed through a standard deinking sequence, shown in FIG. 1.

Deinking system performance in removing the non-impact inks was evaluated by dirt count. Results are found in Table I. These results were achieved at a 50% chemical dose basis as compared to existing office waste deinking chemistry added to the hydrapulper. For comparison, results obtained with conventional office waste deinking chemistry are also found in Table I. Also, a further process simplification was realized, by eliminating the 0.40% on fiber of flotation aid dosage, which typically is added prior to flotation in order to achieve sufficient frothing for impact ink removal. It is worthy to note that both processes removed over 99% of the visible dirt due to the non-impact inks. However, the present invention did so at a substantially lower treatment dosage and without the use of an additional flotation aid.

The removal of dispersed impact inks with the present invention was evaluated by brightness measurement on pulp pads. Most dispersed inks will be removed by flotation and washing so long as the correct treatment is carried out. Flotation feed stock had a brightness of 55.0% flotation deinking raised the brightness to 56.8%. The flotation froth rejects had a brightness of 47.1%, indicating significant dispersed ink removal in the flotation cell without the addition of a separate flotation aid. Washing across a high speed belt washer raised the stock brightness to 63.8%.

TABLE I

| Pulper Chemistry | Treatment | |
|---|---|---|
| | A | B |
| Pulper Dosage (% on Fiber) | 0.30 | 0.75 |
| Separate Flotation Aid (fatty acid ethoxylate) | No | Yes |
| Flotation Dosage (% on Fiber) | 0 | 0.40 |
| Pulper Dirt Count (ppm) | 873 | 578 |
| Deinked Dirt Count (ppm) | 4 | 5 |
| Dirt Reduction - Pulper to Washer (%) | 99.5% | 99.1% |
| Pulper Speck Count (no./sq.m.) | 12,155 | 7,555 |
| Dsinked Speck Count (no./sq.m.) | 100 | 100 |
| Speck Reduction Pulper to Washer (%) | 99.2% | 98.7% |

A: Blend of (a) random linear alcohol alkoxylate, (b) thiol ethoxylate and (c) secondary alcohol ethoxylate in a ratio of (a):(b):(c) of 7:1:2. Thiol ethoxylate may have a hydrophile-lipophile balance (HLB) of from about 2–6.
B: Commercial deinking product - see U.S. Pat. No. 5,141,598.

Example 2

A number of different formulations were tested which contained varying concentrations of thiol ethoxylates and random alcohol alkoxylates. These were dosed individually to 18 g benchtop hydrapulpers containing sorted office waste at dosages of about 0.2% and 0.4%, on dry fiber. This was compared to conventional treatments dosed at the same levels. Pulpers were run for 45 minutes at 150° F., a pH of 11, and a 6% consistency (concentration of fiber in pulper, i.e., 6 lbs. fiber/100 lbs. of pulp slurry).

Results are contained in Table II. As shown, the formulations of the present invention produced enhanced ink particle aggregation (a) lower percentage of small ink particles) and higher ink particle density values than an equal dosage of conventional treatments.

TABLE II

| Formulation | Dose % on Fiber | Aggregation % area ≦ 0.03 sq.mm. | Mean Density (g/cc) |
|---|---|---|---|
| A | 0.2 | 23.6 | 1.022 |
| B | 0.2 | 14.4 | 1.035 |
| C | 0.2 | 7.4 | 1.046 |
| D | 0.2 | 10.1 | 1.048 |
| E | 0.2 | 20.2 | 1.040 |
| A | 0.4 | 18.0 | 1.028 |
| B | 0.4 | 10.7 | 1.132 |
| C | 0.4 | 7.0 | 1.126 |
| D | 0.4 | 8.5 | 1.060 |
| E | 0.4 | 6.6 | 1.164 |

A: Commercial deinking product - see U.S. Pat. No. 5,141,598.
B–E: Blends of (a) random linear alcohol alkoxylate, (b) thiol ethoxylate and (c) secondary alcohol ethoxylate, in ratio of (a):(b):(c) of
B: 4:0:3, with remainder as triethylene glycol
C: 2:2:3, with remainder as triethylene glycol
D: 3:3:1, with remainder as triethylene glycol
E: 7:1.5:1.5
(thiol ethoxylate may have an HLB from about 2–6; secondary alcohol ethoxylate HLB ≦ 10).

While the illustrative embodiments of the invention have been described with particularity, it will be understood that various other modifications will be apparent to those skilled in the art without departing from the spirit and scope of the invention.

I claim:

1. A process for the deinking of waste-paper containing electrostatic printed ink, impact printed ink or combinations thereof, which comprises adding to an aqueous slurry of the wastepaper a combination of (a) an alcohol randomly alkoxylated with a mixture of alkylene oxides to form a surfactant, said surfactant having a molecular weight of from about 600–1000, (b) a thiol ethoxylate surfactant with a degree of ethoxylation of up to about 3 moles of ethylene oxide, and (c) a secondary alcohol alkoxylate with HLB of up to about 10, wherein from about 0.2–0.4 weight percent of said combination, based on dry fiber, is contacted with the pulp, said process enhancing the aggregation and densification of electrostatic toner particles, while promoting foaming in the aqueous slurry of said wastepaper.

2. The process as recited in claim 1 wherein (a) has an aqueous cloud point of about 15°–25° C.

3. The process as recited in claim 1 wherein the temperature is from about 130° F.–180° F.

4. The process as recited in claim 1 wherein the pH is from about 5.0 to about 12.0.

5. The process as recited in claim 1 wherein said surfactant contains ethylene oxide and propylene oxide subunits.

* * * * *